Figure 1:
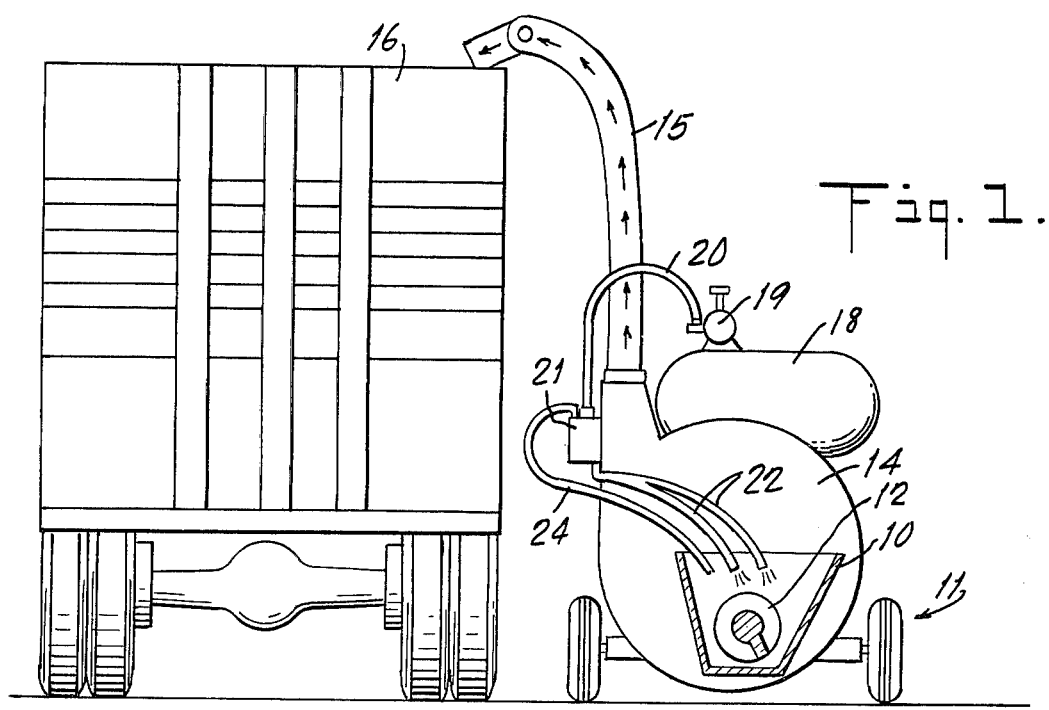

United States Patent [19]

Kjelgaard et al.

[11] 4,310,344
[45] Jan. 12, 1982

[54] METHOD AND APPARATUS FOR THE ADIABATIC EXPANSION OF LIQUID ANHYDROUS AMMONIA

[75] Inventors: William L. Kjelgaard; Paul M. Anderson, both of State College, Pa.

[73] Assignee: Research Corporation, New York, N.Y.

[21] Appl. No.: 86,346

[22] Filed: Oct. 19, 1979

Related U.S. Application Data

[60] Division of Ser. No. 840,845, Oct. 11, 1977, abandoned, which is a continuation-in-part of Ser. No. 716,203, Aug. 20, 1976, abandoned, which is a division of Ser. No. 506,516, Sep. 16, 1974, Pat. No. 3,978,681.

[51] Int. Cl.$^3$ ............................................. C05C 3/00
[52] U.S. Cl. .......................................... 71/61; 71/64.1; 71/64.8; 71/903
[58] Field of Search ............... 71/1, 61, 64 C, 64 SC, 71/64.8, 64.1, 903; 62/51, 55

[56] References Cited

U.S. PATENT DOCUMENTS

| | | | |
|---|---|---|---|
| 2,557,955 | 6/1951 | Ewing | 62/1 |
| 2,612,760 | 10/1952 | Baggette et al. | 62/1 |
| 2,696,785 | 12/1954 | Blue . | |
| 2,973,728 | 3/1961 | Garretson | 71/64 SC |
| 2,973,729 | 3/1961 | Peck . | |
| 3,372,658 | 3/1968 | Ammann . | |
| 3,538,867 | 11/1970 | Every et al. | 71/30 X |
| 3,556,027 | 1/1971 | Ammann . | |
| 4,069,029 | 1/1978 | Hudson | 71/61 X |

Primary Examiner—S. Leon Bashore
Assistant Examiner—F. H. Lander
Attorney, Agent, or Firm—Cooper, Dunham, Clark, Griffin & Moran

[57] ABSTRACT

Cold anhydrous ammonia, preferably cold liquid anhydrous ammonia at substantially ambient or atmospheric pressure is applied to feed grains, forages and anaerobically fermentable plant material to supply thereto and provide therein non-protein nitrogen (NPN). The cold anhydrous ammonia is obtained by supplying a stream of ambient temperature, pressurized anhydrous liquid ammonia to an expansion chamber for expansion therein to provide the cold anhydrous ammonia. Cold anhydrous ammonia, preferably substantially only cold liquid anhydrous ammonia, is recovered from the expansion chamber operated under substantially adiabatic conditions, at a temperature in the range $-30°$ F. to about $-17°$ F. and at substantially ambient or atmospheric pressure, such as at a pressure in the range 1 pound per square inch below atmospheric pressure up to about 5 pounds per square inch atmospheric pressure.

11 Claims, 3 Drawing Figures

U.S. Patent    Jan. 12, 1982    4,310,344

METHOD AND APPARATUS FOR THE ADIABATIC EXPANSION OF LIQUID ANHYDROUS AMMONIA

This is a division of application Ser. No. 840,845 filed Oct. 11, 1977, and now abandoned which, in turn, is a continuation-in-part of application Ser. No. 716,203 filed Aug. 20, 1976, now abandoned, which, in turn, is a division of application Ser. No. 506,516 filed Sept. 16, 1974, now U.S. Pat. No. 3,978,681.

This invention relates to the utilization of ammonia for agricultural purposes. One aspect of this invention relates to the utilization of ammonia as a soil fertilizer. Another aspect of this invention relates to the utilization of ammonia in the treatment of feed grains, forages and silage material to provide therein non-protein nitrogen (NPN). Still another aspect of this invention involves the utilization of anhydrous ammonia in the treatment of agricultural products, including small grains, corn, hay and the like prior to storage to prevent spoilage, such as spoilage due to fungi.

Ammonia in the form of an aqueous solution has been applied to anaerobically fermentable plant material for silage production to provide feed for ruminant animals, the applied ammonia being converted to nitrogen compounds providing non-protein nitrogen (NPN) which is consumable by ruminant animals, see particularly U.S. Pat. No. 3,753,723. The disclosures of this patent are herein incorporated and made part of this disclosure.

In the application of aqueous ammonia solutions to animal feed materials, particularly for silage production, it is necessary to provide not only a source of ammonia but also a source of water so as to produce the aqueous ammonia solution. This has necessitated, particularly when the aqueous ammonia solution is applied to the silage material in the field and/or during harvesting of the plant material for silage production, i.e. freshly cut forage, separate containers and tanks of both ammonia and water and associated mixing equipment. Providing separate sources or tanks and the additionally required mixing and handling equipment is a disadvantage.

Prior art methods of applying anhydrous ammonia to the soil consume considerable energy and have other serious drawbacks. These methods use deep application of the ammonia below the surface of the soil since the ammonia is under substantial pressure and there is risk of loss of liquid and gaseous ammonia. To insure against loss of ammonia special ammonia application equipment is used which injects the ammonia below the soil at a depth of at least 6 inches and typically 6 to 10 inches below the soil surface by means of applicator knives. See Anhydrous Ammonia, Agromony Workshop Report, page 15 for Workshop of Sept. 7, 1966 at Wichita, Kans. and sponsored by Kansas State University and the Agricultural Ammonia Institute, incorporated herein by reference. Due to the deep injection required by conventional ammonia application equipment considerable energy is expended in pulling the equipment around the field. Such equipment typically requires a 10 horsepower tractor rating per injector knife. See Agricultural Engineers Yearbook 1977, page 331, incorporated herein by reference. Fuel consumption by the tractor to pull such equipment over the field is typically 0.7 gallons per acre. Other problems with this equipment are: dull and battered applicator knives, plugging of the knives from mud and freezing. Other maintenance problems of prior art application equipment are disclosed in U.S. Pat. No. 3,799,079, incorporated herein by reference. Also due to the high energy requirements typical spacing for applicator knives on such equipment is 18 to 36 inches. Such wide spacing causes uneven growth with short rooted crops such as wheat or rice.

Certain prior art patents such as Ewing, U.S. Pat. No. 2,557,955; Baggette et al, U.S. Pat. No. 2,612,760; Blue, U.S. Pat. No. 2,696,785; Garretson, U.S. Pat. No. 2,973,728, and Peck, U.S. Pat. No. 2,973,729 have taught ammonia application systems where the ammonia from the pressure tank is cooled prior to passing through a metering device by partially reducing the pressure of the ammonia from the metering device in a heat exchange relationship with the ammonia going to the metering device. This practice is taught merely to improve the accuracy of metering the ammonia. These patents are incorporated herein by reference. However, in none of these patents is there a teaching of reducing the pressure of the ammonia in the expansion stage down to "substantially atmospheric or ambient pressure" such that the liquid ammonia flows by gravity from the expansion stage to the soil nor of dividing the liquid and gaseous ammonia into separate streams.

The Ewing patent indicates that ammonia vaporization is not completed until it reaches the soil injector nozzles which is where the stream is exposed to the atmosphere. Moreover, the Ewing patent is concerned merely with cooling the liquid ammonia entering his system and does not recognize any particular advantage of reducing the pressure to atmospheric or ambient pressure in the distribution conduit. In fact, Ewing suggests using a conventional injection system using pressure for injecting the ammonia to the soil. In contrast in applicants; invention, the ammonia flows by gravity through the distribution system to achieve a low velocity and low pressure discharge of the ammonia from the distribution system.

The Blue patent states at column 5, lines 38–43 that the pressure after the valve 37 is reduced "almost to atmospheric". However, there is no suggestion of using any special type of manifold 93 or of arrangement of conduits 11 to get the ammonia to flow by gravity to the soil. To the contrary, everything in the Blue patent points to the fact that there was only a partial reduction of pressure. FIG. 1 of the Blue patent, for example, shows the hoses 11 directed in an uphill direction which would obviously present problems in a gravity flow system. Likewise, there is no suggestion that the ammonia equipment is anything other than the conventional equipment which injects the ammonia deep below the soil for the purpose of preventing loss of the pressurized ammonia to the atmosphere.

It is an object of this invention to provide an improved technique for the application and utilization of ammonia for agricultural purposes.

It is another object of this invention to provide an improved technique for the application of ammonia to feed grains for forages for silage production or for treatment of feed grains and forages to prevent spoilage during storage.

Still another object of this invention is to provide a technique for the treatment of feed grains and forages, plant silage materials and the like to provide therein a source of non-protein nitrogen suitable for animal consumption.

Still another object of this invention is to provide apparatus useful for the production of cold anhydrous ammonia at substantially atmospheric pressure from pressurized, ambient temperature, liquid anhydrous ammonia.

Figure 2:
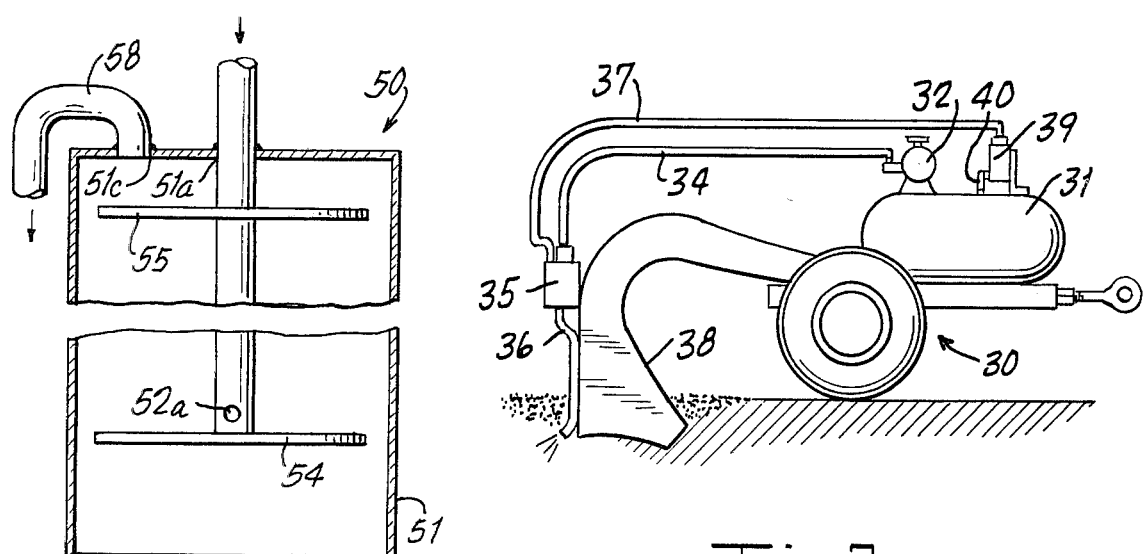
Figure 3:
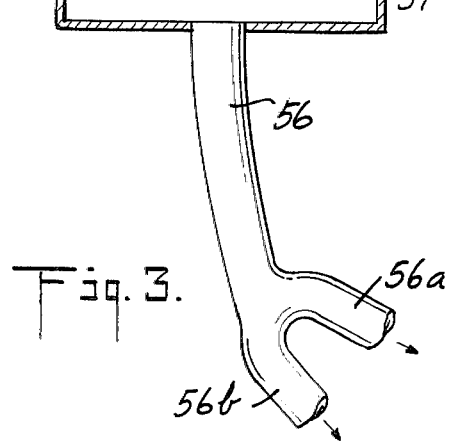

How these and other objects of this invention are achieved will become apparent in the light of the accompanying disclosure made with reference to the accompanying drawings wherein:

FIG. 1 schematically illustrates the practice of this invention in the embodiment wherein cold anhydrous ammonia is applied directly to freshly cut forage material before loading in a truck and transportation for storage to produce silage;

FIG. 2 schematically illustrates another embodiment of the practice of this invention wherein cold anhydrous ammonia is applied for soil fertilization; and wherein;

FIG. 3 illustrates in partial cross-section an apparatus or structure in accordance with this invention for the expansion of a stream of pressurized, liquid, ambient temperature, anhydrous ammonia into two separate streams of cold anhydrous ammonia at substantially ambient or atmospheric pressure, one stream being cold anhydrous gaseous ammonia and the other stream being cold liquid anhydrous ammonia.

In at least one embodiment of the practice of this invention, at least one of the foregoing objects will be achieved.

In accordance with this invention it has been found that anhydrous ammonia is advantageously utilized for agricultural purposes, such as for application to feed grains, forages and anaerobically fermentable plant material for silage purposes to provide non-protein nitrogen (NPN) therein, for soil fertilization and for the protection of small grains, corn, hay and the like from spoilage during storage, when the ammonia is applied in the form of cold anhydrous ammonia, preferably cold anhydrous liquid ammonia, at substantially atmospheric pressure. The cold ahydrous ammonia, preferably in liquid form, and at substantially ambient or atmospheric pressure, is utilized or applied, in accordance with the practices of this invention, at a temperature in the range from about $-30°$ F. to about $-17°$ F., substantially corresponding to stable liquid anhydrous ammonia at atmospheric or ambient pressure, such as a pressure range of about 1 pound per square inch below atmospheric pressure up to about 5 pounds per square inch above atmospheric pressure.

By applying or utilizing the ahydrous ammonia in cold, preferably liquid, form at substantially atmospheric pressure, it has been found that losses of ammonia due to volatilization are substantially reduced because of the low temperature at which the ammonia is applied and because the materials to which the ammonia is applied usually contain sufficient water for substantially complete absorption of the applied cold ammonia, especially when applied in liquid form. The application of the ammonia in cold liquid form at substantially atmospheric pressure overcomes the disadvantages indicated hereinable previously experienced with the utilization of anhydrous ammonia for agricultural purposes when the anhydrous ammonia was employed at substantially ambient temperature, usually in gaseous form, and at substantial pressures above atmospheric pressure, such as 100 psig and more. The application of anhydrous ammonia, particularly in gaseous form, under such conditions permitted the escape of the applied ammonia with resulting ammonia losses to the atmosphere, which ammonia also served as a source of pollution and irritation and potential injury to those working in the vicinity.

The cold anhydrous ammonia is obtained in accordance with this invention by supplying a stream of ambient temperature, pressurized, liquid anhydrous ammonia to an expansion chamber for expansion therein. The expansion of the ambient temperature, pressurized, liquid anhydrous ammonia supplied to the expansion chamber is carried out under substantially adiabatic conditions, that is, under conditions such that substantially no heat is added to the ammonia during the expansion operation. If the expansion chamber is not adequately insulated, some frost will build up on the outside surface thereof in contact with the air. This frost would also serve as an insulator. Aside from such heat as may be picked up by the expanding ammonia from contact with the walls of the expansion chamber, substantially no heat would otherwise be added to the expanding ammonia. By operating the expansion chamber under substantially adiabatic conditions, there would be produced within the expansion chamber cold liquid anhydrous ammonia and cold gaseous anhydrous ammonia, usually at a temperature in the range from about $-30°$ F. to about $-17°$ F. Due to the high heat of evaporation of ammonia a substantially, e.g. major amount, about 80% by weight, of the ammonia supplied to the expansion chamber will be converted to cold stable liquid anhydrous ammonia.

The expansion chamber in accordance with this invention is operated at substantially atmospheric pressure. The supply of pressurized liquid anhydrous ammonia at ambient temperature, such as a temperature in the range 50°–110° F., to the expansion chamber is at a rate such that at least a major amount, e.g. greater than 50% by weight, preferably more than 80% by weight, of the pressurized ambient temperature liquid ammonia supplied to the expansion chamber is expanded to yield cold liquid anhydrous ammonia.

In applying ammonia to the soil in accordance with this invention, there are significant energy, equipment, labor and other advantages compared to prior art anhydrous ammonia application systems. Ammonia discharge into the soil may take place at shallower depths, such as only 3–5 inches, below the soil surface as compared to the 6–10 inch depths of prior art systems. This discharge, in turn, is possible because of the smooth flow of the low velocity liquid ammonia at substantially atmospheric pressure which flows from the distribution lines. Due to the increased soil compaction at greater soil depths the energy required to apply ammonia using conventional equipment is much greater than the energy required using the method of this invention.

Additionally, since equipment for shallow soil ammonia incorporation can be light and does not have to withstand great stress and due to the low velocity, smooth flowing ammonia streams, the ammonia application equipment of this invention can be attached to conventional tillage tools such as field cultivators. Therefore, special ammonia application equipment with injection tool bars and conventional ammonia application knives can be completely eliminated using this invention. Thus an entire trip of the farmer across the field can be eliminated. This results in (1) equipment savings due to elimination of the need for one piece of equipment and also reduced wear and tear on tractors and other such equipment, (2) fuel savings, and (3) labor savings. The elimination of a separate trip across the field also makes low rates of anhydrous ammonia application economically feasible since the ammonia application cost exclusive of fertilizer cost is dramatically reduced.

Also due to the low energy requirements when applying ammonia to the soil by the method of this invention, it is now possible to apply the ammonia at much reduced distances between injection points as compared to conventional prior art methods. Typical spacing for injection knives of conventional prior art equipment is 18 to 36 inches. This compares to a 6-inch spacing possible using this invention. This closer spacing is particularly crucial for short rooted crops such as wheat or rice, or when applying ammonia containing ammonia additives such as micronutrients, herbicides, fungicides or ammonia fixation agents. Uneven or streaked crop growth is the result of having the spacing of ammonia injection too wide. Furthermore, such ammonia additives are very easily and economically added to the ammonia in the expansion chamber of this invention. By contrast, addition of such additives to the ammonia in the pressure storage tank may cause corrosion or "settling out" problems in the tank. Addition of such additives to the pressure lines of conventional prior art ammonia application systems is costly and difficult.

The preferred embodiment of this invention wherein after expansion of the pressurized ammonia in the expansion chamber, such ammonia is separated into separate liquid and gaseous streams has particular advantage in achieving the objectives of this invention. The prior art patents previously discussed clearly suggest the difficulties of distributing a mixture of liquid and gaseous ammonia. This is a further pointed out in the Ammann patents, U.S. Pat. No. 3,556,027 and U.S. Pat. No. 3,372,658, which are incorporated herein by reference. The systems of the Ammann patents cool the pressurized ammonia to cut down on the percentage of gaseous ammonia in the liquid stream. However, since this ammonia is still under pressure, it still requires deep injection into the soil (see column 3, line 35 of U.S. Pat. No. 3,372,658 and column 2, line 60 of U.S. Pat. No. 3,556,027). Applicants achieve separate liquid and ammonia streams at substantially atmospheric pressure in the distribution lines. The significance of this pressure difference can be more clearly seen by the following example: A liquid distribution line of the ammonia application equipment of this invention coming from the expansion chamber has a flow rate of 0.1 to 0.8 gallons per minute for a ½-inch inside diameter hose. A 1-inch inside diameter distribution line is used for the gaseous ammonia coming from the expansion chamber. The pressure in the liquid line is between 0 and 0.3 pounds per square inch above atmospheric pressure and the liquid leaving the end of the distribution line and going into the soil has a velocity of less than 500 feet per minute. By contrast, a conventional anhydrous ammonia application system uses distribution lines having a ⅜-inch inside diameter and typically carry 1.0 to 1.3 gallons per minute of liquid ammonia, plus 5% by weight of gaseous ammonia. The pressure in the line is between about 10 to 15 pounds per square inch above atmospheric pressure and the ammonia leaving the end of the distribution line has a velocity of between about 10,000 to about 15,000 feet per minute.

Reference is now made to the drawings particularly to FIG. 1 thereof wherein there is illustrated one embodiment of the practices of this invention wherein a mixture of cold gaseous anhydrous ammonia and cold liquid anhydrous ammonia at a temperature in the range from about −30° F. to about −17° F., such as a temperature of about −28° F., is applied at substantially atmospheric pressure to freshly cut or harvested plant material suitable for silage production. As illustrated, conveyor body 10 carried on towed or self-propelled wheeled vehicle, generally indicated by reference numeral 11, is provided with an endless conveyor 12, such as a helical disc conveyor. Conveyor 12 serves to transport the plant material added to conveyor body 10 to blower 14 for discharge via chute 15 into truck 16 for transport to the silo for storage of the plant material for silage production.

The plant material put into conveyor body 10 has applied thereto cold, atmospheric pressure anhydrous ammonia in accordance with this invention. Ammonia is supplied from tank 18 carried on vehicle 11. Tank 18 contains pressurized liquid anhydrous ammonia at substantially ambient temperature, such as a temperature in the range 50°–110° F., more or less, depending upon the environment. Pressurized liquid ammonia leaves tank 18 through adjustable control valve 19 and conduit 20 and enters expansion chamber 21. The pressurized ambient temperature liquid anhydrous ammonia is supplied to and adiabatically expanded within expansion chamber 21 at a rate such that a major amount of the supplied pressurized ambient temperature liquid anhydrous ammonia is converted to a major amount of cold anhydrous liquid ammonia at substantially atmospheric pressure, with the remaining minor amount being converted to cold gaseous anhydrous ammonia.

The cold liquid anhydrous ammonia at substantially atmospheric pressure leaves expansion chamber 21 via outlet pipes 22 and the cold gaseous anhydrous ammonia at substantially atmospheric pressure leaves expansion chamber 21 via outlet pipes 24. The cold liquid anhydrous ammonia and the cold gaseous anhydrous ammonia issuing from expansion chamber 21 via outlet pipes 22 and 24, respectively, are discharged directly into contact with and/or applied directly onto the plant material being handled and conveyed within conveyor body 10 for discharge via blower 14 and chute 15 into truck 16.

In FIG. 2 there is illustrated another embodiment of the practice of this invention wherein a wheeled towed trailer, generally indicated by reference numeral 30, which carries tank 31 of pressurized liquid anhydrous ammonia at substantially ambient or atmospheric temperature. As described in connection with FIG. 1, a stream of pressurized ambient temperature anhydrous liquid ammonia is supplied via adjustable control valve 32 associated with tank 31 and supply line 34 to expansion chamber 35 for expansion of the supplied stream of ambient temperature liquid ammonia therein under adiabatic conditions.

There is discharged from expansion chamber 35 via line 36 a stream of cold liquid anhydrous ammonia at substantially ambient or atmospheric pressure. As illustrated, this stream of cold liquid anhydrous ammonia is discharged beneath the surface of the ground into a furrow or opening cut into the surface of the ground by plow 38 fixed to and towed by wheeled vehicle 30. Substantially as soon as the cold anhydrous liquid ammonia is thus-applied beneath the surface of the ground it is covered over with soil and the moisture in the soil serves to rapidly absorb the applied ammonia with the result that little, if any, ammonia is lost to the atmosphere.

In accordance with one feature of the invention embodied in FIG. 2 cold gaseous anhydrous ammonia is recovered from expansion chamber 35 via line 37 and supplied to compressor 39 mounted on tank 31 for compression into liquid ammonia which is then returned to tank 31 from compressor 39 via line 40. As illustrated, only liquid anhydrous ammonia at a temperature in the range from about −30° F. to about −17° F. and at substantially atmospheric pressure is supplied to the soil.

Reference is now made to FIG. 3 of the drawings which illustrates in partial cross section one embodiment of an expansion chamber useful in accordance with the practices of this invention for the adiabatic expansion of ambient temperature pressurized liquid anhydrous ammonia. As illustrated, the expansion chamber, generally indicated by reference numeral 50, comprises a closed chamber or container 51 provided with an inlet opening 51a and discharge openings 51b and 51c. Although chamber or container 51 is illustrated as being substantially cylindrical in shape, any suitable shape, cubical or spherical or the like, would be satisfactory. Inlet opening 51a has passing therethrough and welded and fixed thereon inlet pipe 52, one end of which, as illustrated, terminates at the opposite end of chamber 51 in fairly close proximity to outlet opening 51b. The end of inlet pipe 52 within container 51 is closed with baffle plate 54 welded thereto. One or more openings 52a are provided at the end of inlet pipe 52 adjacent or close to baffle plate 54. At least another baffle plate 55 fixed to pipe 52 is provided at the other end of container 51 in close proximity to outlet opening 51c. Conduit or pipe 56 is welded and fixed to outlet 51b and is in communication with the interior of chamber 51. As illustrated, conduit 56 is provided with one or more branch conduits 56a and 56b. Also, as illustrated, conduit 58 is welded and fixed to outlet 51c and communicates with the interior of chamber 51 via outlet opening 51c.

Conduit 58 serves for the discharge of the expanded gaseous cold anhydrous ammonia from the interior of container 51 and conduit 56 serves for the discharge of cold anhydrous ammonia from the interior of chamber 51. Baffle plates 54 and 55 which extend outwardly toward and close to the inner periphery of container 51 provide an annulus or annular space between baffle plates 54 and 55 and the interior of container 51 and serve to effect a better separation between the cold gaseous anhydrous ammonia and the cold liquid anhydrous ammonia within chamber 51.

In the operation of the expansion chamber 50 pressurized liquid ambient temperature anhydrous ammonia, such as ammonia at a temperature in the range 30°–100° F. e.g. about 60° F., is supplied via pipe 52 and is discharged for expansion within container 51 via openings 52a just above the lower baffle plate 54. In operation the pressure within container 51 is substantially atmospheric or essentially zero psig. The expansion of the pressurized liquid ammonia introduced into container 51, due to the relatively high heat of evaporation of ammonia, produces therein cold, stable liquid anhydrous ammonia. Two streams leave expansion chamber 50 or container 51, one stream being cold liquid anhydrous ammonia at substantially atmospheric pressure via line 56 and the other stream being cold gaseous anhydrous ammonia at substantially atmospheric pressure via line 58. Generally, the flow of gaseous or vaporized ammonia from container 51 is directly proportional to the ammonia cooling requirements plus the expansion chamber heat gain from surrounding environment or air. Under steady state conditions of operation container 51 becomes insulated with frost. Due to the high heat of evaporation of ammonia the gaseous ammonia flow from container 51 via conduit 58 will normally be less than 20% of the total mass flow of ammonia from container 51. Cold stable liquid anhydrous ammonia at substantially atmospheric pressure and at a temperature of about −28° C. tends to collect at the bottom of container 51 and is discharged therefrom via outlet opening 51b and discharge pipe or conduit 56 and flows by gravity into the distribution system in fluid communication with branch conduits 56a and 56b for discharge as a stable liquid stream of cold anhydrous ammonia at substantially atmospheric pressure into the material being treated. The amount of cold liquid anhydrous ammonia discharged from container 51 via outlet 51b and conduit 56 will normally be about 80% or more by weight of the ammonia flow from container 51.

The hereindescribed cold flow method for the application of anhydrous ammonia for agricultural purposes in accordance with this invention has great versatility. One outstanding advantage of the practice of this invention is the improved safety and efficiency of applying anhydrous ammonia as a soil fertilizer or as a feed or forage additive or for the protection of stored grains and animal food and the like to prevent spoilage. By suitable operation of the expansion chamber there is produced varying ratios of cold liquid anhydrous ammonia relative to cold gaseous anhydrous ammonia, both being at substantially atmospheric pressure, issuing from the expansion chamber. Generally, it is preferred that the weight ratio of the liquid to gaseous ammonia be in the range of 2–8:1, the gaseous and liquid ammonia streams being at a temperature in the range of −20° F. to about −17° F., preferably at a temperature of about −28° F., the temperature corresponding to the temperature of stable liquid ammonia at atmospheric pressure. Since the cold liquid ammonia is produced at atmospheric pressure it flows by gravity to the release point into contact with the material being treated where it is discharged at low pressure and velocity resulting in improved safety and utilization of the applied ammonia. Since the applied ammonia is cold, below about −17° F., about −28° F., the escape and loss of the applied ammonia to the surrounding environment is reduced and the applied ammonia is more readily trapped and absorbed by the material, plant, grain material or the soil, being treated. In this connection the ammonia retention rates in connection with silage production, even involving the application of cold liquid ammonia to silage material just before loading into silos, is equal to ammonia retention rates achievable when ammonia dissolved in water is added for silage production.

When cold anhydrous ammonia is added to corn silage in accordance with this invention the crude protein is increased from 8% to about 13%. The results of tests carried out involving the treatment of silage with cold liquid ammonia in accordance with the practices of this invention show that the efficiency of recovery of nitrogen of the ensiled is about 80%. In tests carried out in accordance with this invention the protein content of the untreated silage amounted to 7.95% of DM and with ammonia addition in accordance with this invention the protein equivalent amounted to 11.47% of DM. The amount of ammonia applied was 6.6 pounds per ton and the amount of retained nitrogen and ammonia per ton amounted 4.2 and 5.1 pounds, respectively. In terms of feeding value to ruminants one part nitrogen is equivalent to 6.25 parts crude protein. As a source of nitrogen, ammonia is composed of 82% by weight nitrogen. Accordingly, when a farmer adds an amount of anhydrous ammonia corresponding to 1% by weight of the silage on a dry weight basis he is adding 0.82% nitrogen. This amount corresponds to an increase of approximately 5% crude protein in the silage.

Desirably, all the ammonia is utilized as cold liquid ammonia. When the ammonia in accordance with this invention is added as a preservative to high moisture packaged hay, data indicates that the ammonia will preserve hay quality. In the application of the cold liquid ammonia to hay in accordance with this invention the cold liquid ammonia would be deposited on top of the hay windrow either just prior to baling machine pickup or during the machine function. This provides good distribution of ammonia throughout the hay mass. A 1% ammonia treatment based on 25% moisture hay for typical hay yields would be adequate.

As indicated hereinable anhydrous ammonia is useful as a preservative of the organic material, such as small grains, corn, hay and the like, where the moisture content and other properties will not support fermentation for silage production. Ammonia has proven toxic to many fungi causing spoilage. In this connection the application of cold ammonia in accordance with this invention as a preservative to prevent spoilage due to fungi and the like is particularly useful. Ammonia has also been proven to be a detoxifier of certain mycotoxins. For example, ammonia has removed aflatoxin from wet corn grain.

Cold flow or cold liquid anhydrous ammonia produced in accordance with this invention is useful as a feed grain additive, as an alternative protein source for ruminants, i.e. as a source of NPN. The applied anhydrous ammonia could meet one-third of the protein need in cattle feeding. This is particularly significant when natural protein are in short supply or are expensive.

As will be apparent to those skilled in the art in the light of the foregoing disclosure, many modifications, alterations and substitutions are possible in the practice of this invention without departing from the spirit or scope thereof.

We claim:

1. In an operation wherein a nitrogen source is applied to the soil as fertilizer by means of a distribution conduit to promote the growth of plants and the like in the soil, the improvement which comprises employing as said nitrogen source a stream of cold anhydrous ammonia, said stream of cold anhydrous ammonia being at ambient or atmospheric pressure when passing through said conduit and into the soil, said stream of cold anhydrous ammonia being introduced into the soil beneath the surface thereof, said stream of cold anhydrous ammonia being obtained by adiabatically expanding a pressurized stream of anhydrous liquid ammonia, said pressurized stream of anhydrous liquid ammonia being expanded being at ambient temperature.

2. An operation in accordance with claim 1 wherein said stream of pressurized anhydrous liquid ammonia is expanded so as to produce a mixture of cold anhydrous liquid ammonia and cold anhydrous gaseous ammonia, said mixture being at ambient or atmospheric pressure.

3. An operation in accordance with claim 2 wherein the weight ratio of cold liquid ammonia to cold gaseous ammonia in said mixture is in the range 2–8:1.

4. An operation in accordance with claim 2 wherein said mixture of cold anhydrous liquid ammonia and cold anhydrous gaseous ammonia is obtained by introducing a pressurized ambient-temperature stream of anhydrous liquid ammonia into an expansion chamber provided with one outlet useful for the separation and recovery therefrom of a stream of cold anhydrous gaseous ammonia and another outlet useful for the separation and recovery therefrom of a stream of cold anhydrous liquid ammonia, said stream of gaseous ammonia and said stream of liquid ammonia recovered from the respective outlets of said expansion chamber being at substantially ambient or atmospheric pressure.

5. A method of applying ammonia to the soil which comprises introducing a stream of ambient-temperature pressurized liquid anhydrous ammonia into an expansion zone for substantially adiabatic expansion therein, said expansion zone being provided with one outlet useful for the withdrawal of cold gaseous anhydrous ammonia at ambient or atmospheric pressure therefrom and another outlet useful for the withdrawal of cold liquid anhydrous ammonia at ambient or atmospheric pressure therefrom, interrupting the flow of the introduced stream of pressurized ambient-temperature liquid ammonia within said expansion zone by providing a baffle between the point of introduction of said pressurized liquid ambient-temperature anhydrous ammonia within said expansion zone and said other outlet useful for the withdrawal of cold ambient or atmospheric pressure liquid ammonia from said expansion zone to effect separation between cold liquid ammonia and cold gaseous ammonia within said expansion zone, said expansion zone being maintained at substantially atmospheric pressure, withdrawing from said expansion zone via said other outlet a stream of cold liquid anhydrous ammonia at substantially ambient or atmospheric pressure, withdrawing from said expansion zone via said one outlet a stream of cold gaseous anhydrous ammonia at substantially ambient or atmospheric pressure and applying at least one of the thus-withdrawn streams of cold gaseous ammonia and cold liquid ammonia to the soil beneath the surface thereof as a fertilizer.

6. In an operation wherein a nitrogen source is applied to the soil as fertilizer to promote the growth of plants and the like in the soil, the improvement which comprises employing as said nitrogen source a stream of cold anhydrous ammonia, said stream of cold anhydrous ammonia being obtained by substantially adiabatically expanding a pressurized stream of anhydrous liquid ammonia to produce a mixture of cold anhydrous liquid ammonia and cold anhydrous gaseous ammonia, and wherein said mixture of cold anhydrous liquid ammonia and cold anhydrous gaseous ammonia is obtained by introducing a pressurized ambient-temperature stream of anhydrous liquid ammonia into an expansion chamber and allowing said stream of ammonia to reach substantially ambient or atmospheric pressure, said chamber provided with one outlet useful for the separation and recovery therefrom of a stream of cold anhydrous gaseous ammonia and another outlet useful for the separation and recovery therefrom of a stream of cold anhydrous liquid ammonia, said stream of gaseous ammonia and said stream of liquid ammonia passing through and from the respective outlets of said expansion chamber being at substantially ambient or atmospheric pressure and being introduced into the soil beneath the surface thereof.

7. An operation in accordance with claim 6 wherein said stream of liquid ammonia flows by gravity from the expansion chamber to the point of contact with the soil by means of a distribution system having branch conduits, and wherein said stream of liquid ammonia is discharged from said distribution system as a stable liquid stream of cold anhydrous ammonia at substantially atmospheric or ambient pressure beneath the surface of the ground.

8. An operation in accordance with claim 7 wherein substantially as soon as said stream of liquid ammonia is applied beneath the surface of the ground, said stream of liquid ammonia is covered over the soil.

9. An operation in accordance with claim 8 wherein as soon as said stream of liquid ammonia is covered with soil, said liquid ammonia is rapidly absorbed by the moisture in the soil with the result that little or no ammonia is lost to the atmosphere.

10. An operation in accordance with claim 7 wherein the pressure within said expansion chamber is essentially zero psig.

11. An operation in accordance with claim 6 wherein said distribution system is attached to a plow and wherein said stream of liquid ammonia is discharged beneath the surface of the ground in a furrow cut into the surface of the ground by the plow.

* * * * *